Sept. 8, 1931.  W. F. HUNT ET AL  1,822,625
ACETYLENE GENERATOR
Filed Aug. 10, 1926  2 Sheets-Sheet 2

Patented Sept. 8, 1931

1,822,625

UNITED STATES PATENT OFFICE

WILLIAM F. HUNT, OF NEW BRIGHTON, AND HERMANN C. STELLING, OF ORANGEBURGH, NEW YORK, ASSIGNORS TO OXWELD RAILROAD SERVICE COMPANY, A CORPORATION OF DELAWARE

ACETYLENE GENERATOR

Application filed August 10, 1926. Serial No. 128,464.

This invention relates to self-contained carbide generators and outdoor lamps and particularly to a portable enclosed-flame acetylene lamp that is especially adapted to the use of car inspectors and other railroad employees. However, it will be understood that features of the improved generator and lamp are adapted for general use and may be employed separately or in combination with other devices.

Inasmuch as a satisfactory outdoor lamp must be capable of operating properly under all weather conditions, one object of our invention is to provide an outdoor acetylene lamp of sturdy construction, weather-proof, and one in which the flame shall be so enclosed that it will stay lighted in rainy, windy or other adverse weather. In order that it may be suitable for workers under and about railroad equipment and the like it is essential that the lamp shall be low and have a wide base and low center of gravity so that it will not be easily overturned.

Owing to the fact that calcium carbide swells when it reacts with water it is important that the proper amount of calcium carbide be employed in charging the lamp, any deficiency shortening the operating period before recharging is required and any excess, not only causing a waste of carbide, but also shortening the burning period by forcing sludge up into the lamp and clogging the gas passage. This will also cause difficulty in cleaning the generator and if the excess is great enough might seriously injure the lamp. To insure that the proper charge is used we have made the bottom of the carbide chamber in the form of a cup which serves as a measuring receptacle. The size of the cup is such that if filled level full the correct charge of carbide is ensured and even if heaped as high as possible no difficulties are likely to result therefrom.

As some moisture may be carried over with the gas it is essential to provide a liquid collecting chamber in the gas conduit. This must be closed to prevent the escape of gas during operation of the lamp and opened periodically to remove the liquid which collects. As the user is likely to overlook this we have provided means for automatically draining the liquid collecting chamber when the generator is opened for the purpose of replenishing the carbide chamber or for any other purpose.

In order to reduce the over-all height of the generator and utilize all the water therein, a portion of the floor of the water chamber is depressed so that the water outlet shall be as low as possible therein, a part of such depression being lower than the outlet to form an annular channel to collect and hold any sediment which may be present in the water chamber.

In order that the lamp may have varied fields of usefulness we have provided means for projecting light rearwardly as well as from the front. This is done by providing suitable openings in the housing which are closed by either plain or refracting transparent members.

Thus it is evident that among the objects of our invention are the provision of a simple, durable, and cheap yet efficient and reliable generator and lamp which shall have means whereby moisture in the gas is collected before it reaches the burner and at times is automatically drained; means for securing substantially the correct charge of carbide; which shall be of minimum height and of a low center of gravity; have lenses projecting the light rearwardly as well as forward; and be provided with a dependable protected water feed mechanism.

These and other objects of our invention will be evident from the following description having reference to the annexed drawings wherein.

Figure 1:
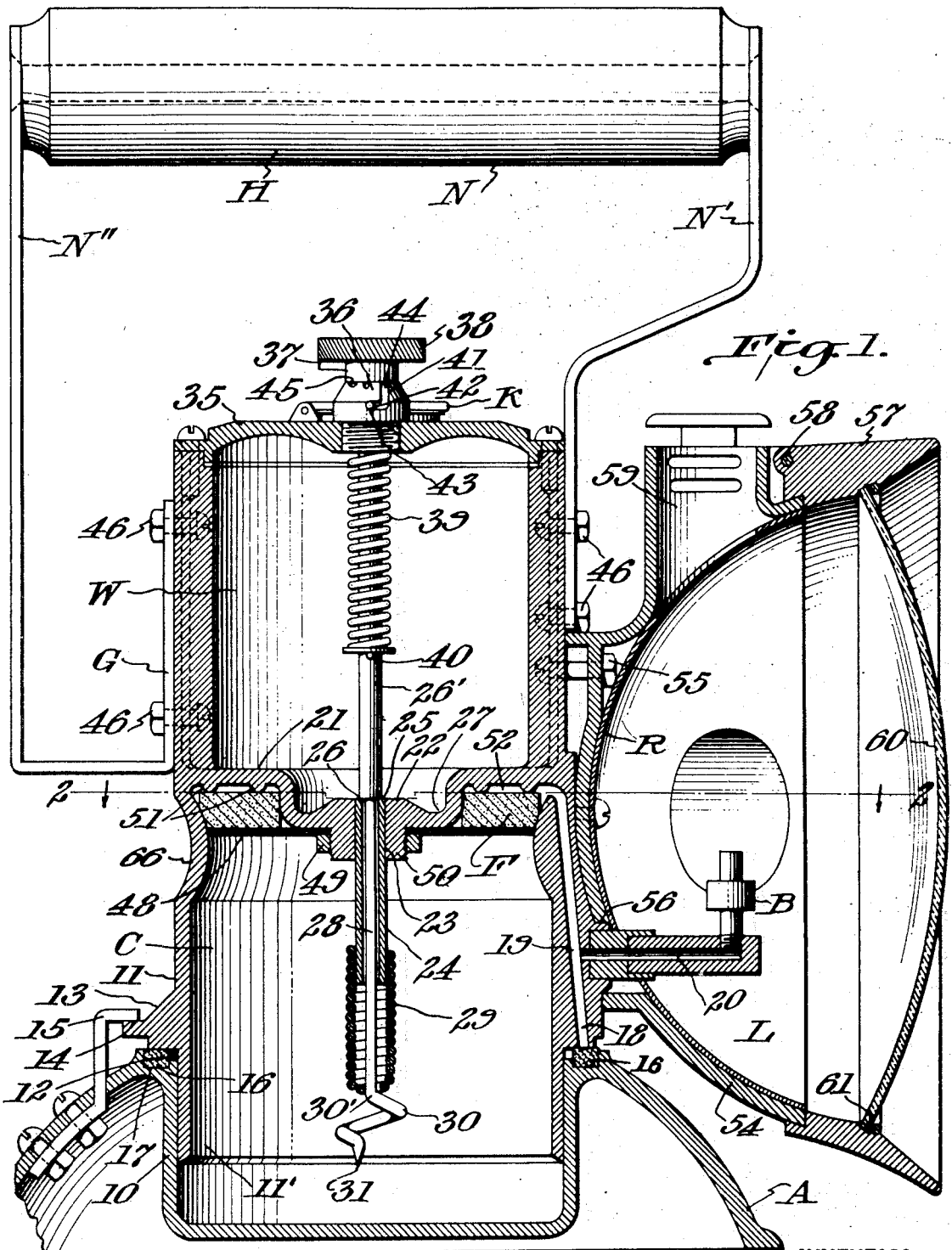
Fig. 1 is a vertical section through a lamp and generator embodying one form of our invention.
Figure 2:
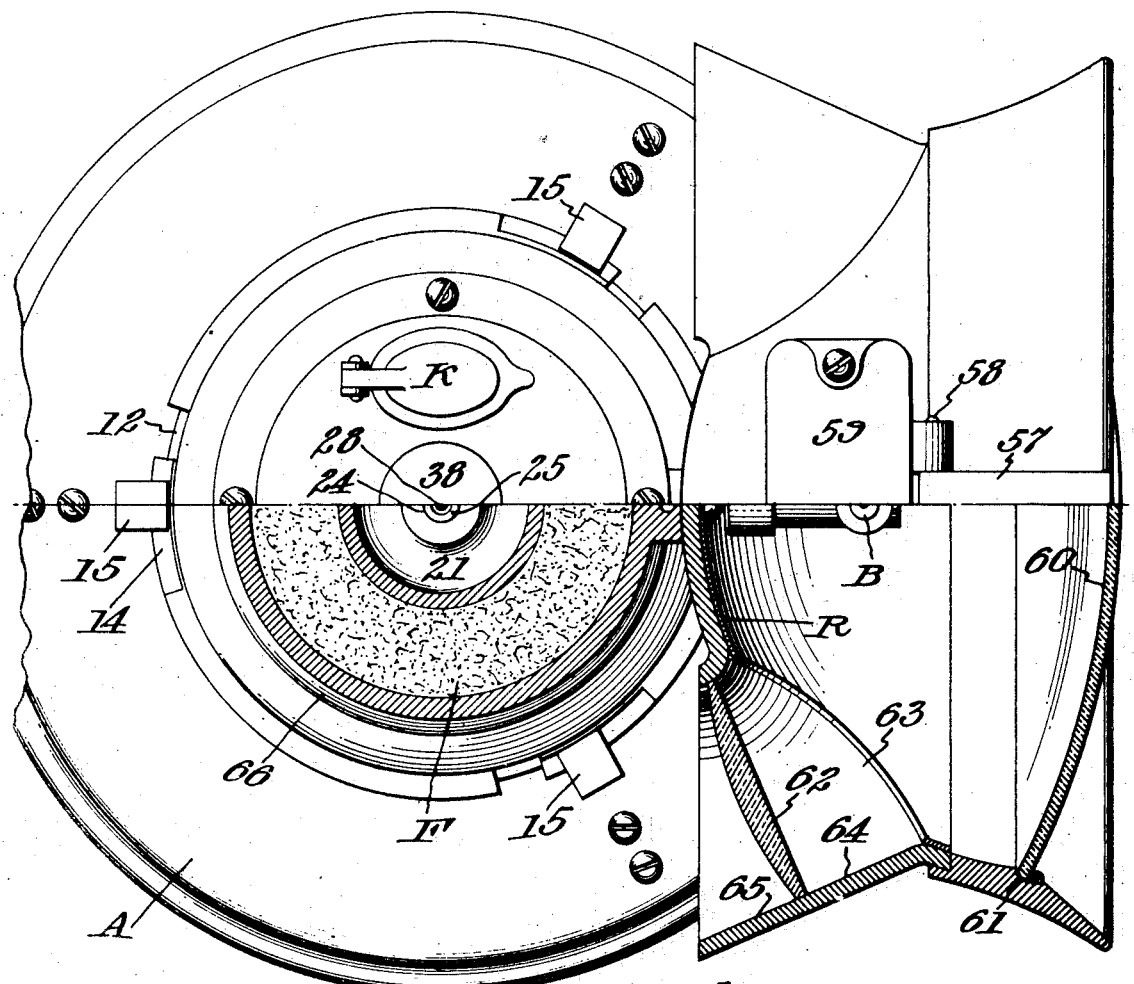
Fig. 2 is a top view, half in section of the device shown in Fig. 1 with the handle removed.

As shown in the drawings, a portable lamp embodying this invention comprises an acetylene generator G arranged to supply acetylene to a burner B in a housing L mounted on the front of the generator. The generator G comprises a water chamber or reservoir W disposed above a carbide or generating chamber C which is, in fact, formed by a cup-shaped bottom 10 that serves as a carbide measuring receptacle and telescopically fits the tubular lower end 11' of the wall 11 of the cylindrical generator body. As shown, the receptacle is desirably formed integral with and depends centrally into an enlarged hollow base A. An annular shoulder 12 is formed at the juncture of the upper edge of the receptacle 10 and the inner upper edge of the base A to cooperate with an integral exterior shoulder or collar 13 on the wall 11 and thereby support the other parts of the lamp on the base, suitable means being provided to releasably secure the base and receptacle to the aforesaid parts. As shown, spaced inclined surfaces 14 may be formed integral with the collar 13 and arranged to cooperate with similarly spaced rigid hooks 15 on the base A, whereby the telescopic engagement and disengagement of the receptacle and the wall 11' with a short relative rotation of these parts will couple and uncouple them. An annular gasket 16 is desirably set in a similar groove 17 in the upper face of the shoulder 12 to seal the gas generating chamber and a water collecting trap 18 at the lower end of a gas outlet passage 19 that is formed in the wall 11 and leads to the inner end of the pipe 20 which carries the burner B. By locating the receptacle 10 within the hollow base A, two important advantages are obtained, viz., the center of gravity of the lamp is considerably lowered which renders the lamp less liable to be accidentally overturned; and the housing L is considerably lowered so that the light beam may be projected from a lower part of the lamp, which is desirable in many conditions of use. Furthermore, the capacity of the receptacle is such that it will contain the correct quantity of carbide when filled to the level of the shoulder 12. This avoids introducing too little or too much carbide into the generating chamber which, on the one hand shortens the operating period and requires more frequent recharging, and on the other hand results in waste and clogged passages when the carbide swells. The length of the wall 11' below the collar 13 is preferably such that, when the filled cup is secured in place, said wall will slide along the inside wall of the cup through the carbide, until its lower end is a substantial distance below the level of the carbide.

The carbide and water chambers are separated by a partition 21 preferably integral with the wall 11 of the generator. A depression 22 is formed centrally in the upper side of the partition 21 to increase the effective head of the comparatively small volume of water in the water chamber, so that the water will feed properly, even when this chamber is nearly empty. The partition 21 has a central aperture 23 into which a water feed tube 24 is tightly fitted. This feed tube depends a short distance into the carbide chamber and is desirably of wear-resistant and non-corrosive metal so that it may be provided at its upper end with a suitable seat 25 for the valve 26. The inlet of the feed tube 24 is above an annular channel 27 in the depression 22 which collects small particles of dirt in the water and prevents them from flowing into the inlet and interfering with the steady flow of water.

Figure 3:
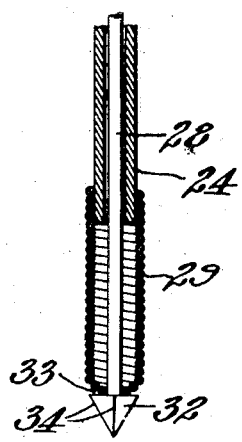
Fig. 3 is a detail view of a modified form of water controlling and carbide stirring means.

A water regulating and carbide stirring rod 28 is secured to the valve and extends through the tube 24 into the carbide chamber. This rod is smaller in diameter than the tube 24 so as to permit the passage of water through the annular space between them and is movable with the valve 26 to clear this tube of any obstruction which might clog it. A tubular water distributor 29 is telescopically fitted on the lower end of the feed tube 24 so as to slide up and down with the valve and rod to clear away and break up carbide adjoining the distributor and feed tube. The distributor 29 is desirably in the form of a helical coil of closely wound wire, having water discharge openings between the coils and at its upper and lower ends. The lower end of the rod 28 is desirably formed with suitable means to support the distributor and to break up the carbide when the valve and rod are raised, lowered and turned about their vertical axis. As shown in Fig. 1, the rod may be provided with raking and stirring means such as a zig-zag or bent portion 30 at its lower end which terminates in a point 31, the upper bend 30' adjacent the straight part of the rod forming a shoulder to support the distributor and other bends providing longitudinal wings projecting laterally on opposite sides to engage and break up or displace the adjoining carbide as the rod is rotated. Instead of a reversely bent or irregular end, the rod 28 may have a triangular or other non-circular irregular shaped knob 32 secured to its lower end, as shown in Fig. 3, the top of the knob providing a shoulder 33 to support the distributor and the outwardly projecting longitudinal edges or wings 34 thereof breaking up and displacing portions of the carbide mass when the rod is turned, raised or lowered.

The calcium carbide, which swells during its reaction with water, forms a compact mass that adheres to and bridges the inside of the wall 11' and is centrally supported by the water feed devices in the generating chamber, whereby the carbide receptacle will be substantially emptied when it is removed for recharging, the spent residue being held within said wall about said devices from which it may be loosened and dumped later.

The stem 26' of the valve 26 extends through a central hole in the removable cover 35 of the water chamber and through a boss 36 on the outside of said cover, and has an operating knob 37 fast on its outer end, which knob is desirably formed with an enlarged knurled head 38. A spring 39 encircling the valve stem 26' has its ends bearing respectively, against a cross pin 40 on the stem and against the inside of the cover 35 and normally tends to hold the valve against its seat. The cover 35 is also provided with a suitable water-filling opening closed by a cap K. To provide means for locking the valve in closed position, the boss has opposed bayonet slots 41 arranged to receive the ends of a cross pin 42 on the valve stem just below the knob 32. As shown in Fig. 1, the ends of the pin 42 are in the horizontal portions 43 of the bayonet slots 41 and tightly lock the valve in closed position. To open the valve, the knob 37 must be turned and then lifted through the vertical parts 44 of the bayonet slots; and to lock the valve in open position, the knob is again turned when the pin 42 is opposite the top of the boss 36, suitable recesses 45 being provided in the top surface of this boss to receive the ends of the pin 42 and latch the valve in this position. A number of such recesses 45 may be arranged in steps on the top surface of the boss 36 so that the valve may be latched open at different distances from its seat. The pressure of the spring 39 is sufficient to hold the valve 26 in any one of its adjusted and locked positions, and the turning and lifting of the valve is advantageous in that it grinds the valve face against its seat 25 to maintain a good fit, and also clears the water feed passage and plows or opens up the carbide because the rod 28 and distributor 29 are moved every time the valve is opened or closed. The spring 39 is under compression when the valve is open and suddenly thrusts the valve stem 26' and all parts connected thereto downwardly when the knob 37 is turned so as to set the pin 42 in line with the vertical slot 44. The valve and connected parts may be advantageously reciprocated in this manner a number of times while the lamp is operating, because lifting and suddenly dropping the valve stem results in clearing the water feed passage and opening up the carbide mass. To facilitate operating the valve 26, the handle H has a rigid horizontal grip portion N directly above the knob 38 and at such a distance from it that the knob can be easily reached and manipulated by two fingers of the hand which holds the handle. With the palm of the hand resting on top of the handle section N and braced thereby, these fingers may grip opposite sides of the knob beneath its head 38 and exert considerable force upwardly against the spring 39 and the friction of parts embedded in the carbide, when the valve is to be opened. The handle section N is desirably provided with a longitudinally corrugated soft rubber covering and comprises a cylinder of substantial diameter, forming a grip of convenient size for the hand, that is rigidly secured at its ends to the upper ends of handle sections N' and N" formed of stiff metal strips secured to the front and rear sides of the generator, as by bolts 46 which have their heads embedded in the generator wall. The broader features of this handle construction are claimed in application Serial No. 723,382 filed in the name of William F. Hunt.

The acetylene generated in the chamber C passes through a filter F into the gas passage 19, in the wall 11 of this chamber and thence through burner pipe 20 to the burner in the housing L. A perforated plate 48, held in place by a nut 49 threaded onto a central boss 50 on the lower side of the depressed part of the partition 21, holds the filter pad F of felt or other suitable material against projections or beads 51 on the under side of the partition, gas spaces 52 being formed between such beads communicating with the entrance of the passage 19 adjacent the partition 21.

The burner pipe 20 opens into the gas passage 19 at a point above the lower end of the latter, providing the water-collecting well 18 below that point which opens into the lower face of the collar 13 but is closed and sealed by the gasket 16 when the carbide receptacle and base of the lamp are secured in place. The gas passing through the filter is freed of solid matter and, to a large extent, of liquid but some liquid may be carried farther either as fine spray or as vapor, which condenses in the gas passage 19 and ordinarily discharges through the burner and results in a fluctuating and unsatisfactory light. In the present construction, however, practically all of such liquid flows into the well 18 which is a downward extension of the passage 19 and from which water may be drained in various ways, the preferable way being to arrange the lower end of the well as shown so that the liquid trapped therein will be automatically drained every time the carbide receptacle and base are removed. With the gas passage 19 in line with the well 18, suitable means such as a wire may be easily inserted to clean both of them.

The housing L comprises a main parabolic section 54 rigidly mounted on the front of the generator by bolts 55 and by a shoulder 56 formed by a boss which carries the burner B, and a section 57 hinged at 58 to the main section and latched thereto at the side opposite such hinge. The main section carries a reflector R back of the burner B and a chimney 58, whereas the hinged section carries a suitable lens or cover glass 60 in a groove 61 back from the forward edge so that the latter forms a shield to protect such lens and to shut off light thrown laterally. The groove 61 may be designed so that a clear lens and a colored lens may be held in place together in series, as we have found that a clear lens when thus used with a colored lens provides a much more satisfactory signalling light than when a colored lens is used by itself. Other lenses may be mounted on the housing in addition to the front lenses. As shown, lenses 62, either clear or colored, may be inserted in similar openings 63 in the main section opposite the front lens and at opposite sides of the burner, the walls adjoining such openings being of polished aluminum or otherwise provided with properly inclined reflecting surfaces at 64 and projecting rearwardly beyond the lenses, as at 65, to form shields to protect the lenses and render the light emitted therefrom visible only from the rear and not from the side of the lamp. In order to afford a full view of the rear lenses and to avoid obstructing the light therefrom, the generator may be recessed or circumferentially grooved opposite them, as at 66. The groove 66 may also serve as a recess for the thumb and a finger when the lamp is gripped by the generator instead of by the handle.

A number of the larger parts of the lamp, such as the generator G including its base and cover, and the housing L are desirably die cast of aluminum or other suitable light non-corrosive metal to reduce the weight and the cost of constructing, assembling and repairing the lamp. As shown, the water reservoir and top section of the generating chamber with their separating partition are die-cast as a hollow body, and the hollow base and carbide receptacle are die-cast as a unit.

The operation of the generator and lamp will be understood from the foregoing description. Various changes may be made in the details of construction and arrangement of parts without departing from the spirit of our invention or sacrificing any of its advantages.

We claim:

1. An acetylene generator comprising a generating chamber having a wall, a hollow base, a carbide receptacle on said base and extending therein, and means on said base to secure said receptacle to said wall of the generating chamber.

2. An acetylene generator according to claim 1, wherein said receptacle is entirely within said base, telescopically fits said wall, and serves as means to measure a correct charge of carbide for the generator.

3. An acetylene generator according to claim 1, wherein said receptacle and said base are joined together and a shoulder is formed at such joint, and a collar on said wall bearing against said shoulder.

4. An acetylene generator according to claim 1, wherein said receptacle and said base are joined together at their upper edges and a shoulder is formed at such joint, said receptacle constituting means to accurately measure a full charge of carbide for said generator, said wall having an exterior collar, in combination with a gasket between said shoulder and said collar, and means to clamp said collar and wall gas-tight to said base and receptacle.

5. An acetylene generator comprising a carbide receptacle, a generating chamber wall telescopically fitting said receptacle and extending a substantial distance into the same, and means whereby said receptacle is detachably coupled to said wall.

6. In an acetylene generator, the combination of a generating chamber having a detachable carbide receptacle, a gas outlet passage for said chamber having a trap to collect liquid carried from said chamber into said passage, and means on the receptacle to permit the discharge of liquid from said trap when said receptacle is detached.

7. An acetylene generator comprising a generating chamber, a water reservoir, and means for regulating the flow of water from said reservoir to said chamber and for stirring carbide in the latter, such means comprising a water feed tube, a rotatable rod movable up and down therein, a tubular water distributor, and means at the lower extremity of said rod supporting said distributor and having laterally projecting portions operative to engage and displace adjoining carbide when the rod is moved.

8. An acetylene generator comprising a generating chamber; a water reservoir; and means for regulating the flow of water from said reservoir to said chamber comprising a water feed passage from said reservoir to said chamber, a valve controlling said passage, and a rod movable with said valve extending through said passage into said chamber and provided with a reversely bent carbide-stirring portion adjacent its lower end.

9. An acetylene generator comprising a generating chamber; a water reservoir; and means for regulating the flow of water from said reservoir to said chamber comprising a water feed passage from said reservoir to said chamber, a valve in said reservoir controlling said passage, a rod movable with said valve extending through said passage into said chamber, and laterally projecting means on the lower end of said rod providing longitudinal edges or wings adapted to stir carbide in said chamber.

10. An acetylene generator comprising a generating chamber having a gas outlet passage, a water reservoir above said generator and separated therefrom by a partition having a depression in its upper side and projections on its lower side, said reservoir having a water outlet in said depression above the bottom of a portion of the latter; and a filter held against said projections but leaving a gas space between said filter and the lower side of said wall that communicates with said outlet passage.

11. An acetylene generator comprising a generating chamber, a water reservoir, a water feed passage leading from said reservoir to said chamber, water feed controlling means comprising a valve for said passage and a rod movable with said valve and extending through said passage into said chamber, a spring tending to hold said valve closed, and means for lifting said valve and rod and for turning the same when the valve is closed.

12. An acetylene generator according to claim 11, in combination with means to hold such lifting means in raised position, said lifting means being releasable to drop said valve to its seat.

13. An acetylene generator comprising a generating chamber, a water reservoir having a wall provided with an aperture, a water feed tube fitted in said aperture having an outlet opening in the bottom wall of said chamber, said wall consisting of a non-rusting metal such as aluminum, said tube having a valve seat formed therein at its entrance in a metal harder than said wall.

14. An acetylene generator comprising a hollow body having a closure at each end, one of said closures being a cover and the other being a base having a tubular part forming a portion of said body to define a carbide chamber and a flared part external to said tubular part, a wall in said body partitioning the same into a water reservoir and a generating chamber, said wall having an outlet at the bottom of the reservoir for communicating with the generating chamber and a valve seat at said outlet, a rod extending through said cover and outlet, an outlet-controlling valve cooperating with said valve seat and a stirrer extending into said generating chamber carried by said rod, spring means on said rod tending to close said valve, means external to the cover on said rod for lifting the valve from its seat, for turning the same when it is seated and for turning the stirrer and means on said cover operable to retain the valve closed and to hold the valve open.

15. An acetylene generator comprising a generating chamber having a wall, a hollow base, and a carbide receptacle secured to said wall and to said base and extending into the latter, said chamber having a gas outlet passage provided with a liquid trap, means to detachably couple said receptacle to said wall, and means in combination with said receptacle whereby said trap is closed when said receptacle is coupled to said wall but is opened to drain liquid from the trap every time said receptacle is uncoupled from said wall.

16. An acetylene generator comprising a generating chamber having a wall, a hollow base, and a carbide receptacle secured to said wall and to said base and extending into the latter, said receptacle and said base being joined together so as to form a shoulder, a collar on said wall, means in said shoulder to carry a gasket opposite said collar, a gas outlet passage for said chamber having a liquid trap opening in the face of said collar opposite said gasket and normally sealed by the latter.

17. An acetylene generator comprising a generating chamber, a gas outlet passage therefor, and means in connection with said passage for collecting liquid that is carried from said chamber into said passage; said means comprising a well below and communicating with said outlet passage, in combination with a closure for the discharge outlet of said well arranged to be opened every time said generating chamber is opened.

In testimony whereof, we affix our signatures.

WILLIAM F. HUNT.
HERMANN C. STELLING.